US010738370B2

(12) United States Patent
Mokmeli et al.

(10) Patent No.: US 10,738,370 B2
(45) Date of Patent: Aug. 11, 2020

(54) RECOVERY OF CESIUM FROM EPITHERMAL MINERAL DEPOSITS

(71) Applicant: CASCADERO COPPER CORPORATION, North Vancouver (CA)

(72) Inventors: Mohammad Mokmeli, Cadds Ford, PA (US); David Dreisinger, Delta (CA); David L. Trueman, North Vancouver (CA); Bruce W. Downing, North Vancouver (CA); Bill McWilliam, North Vancouver (CA)

(73) Assignee: Cascadero Copper Corporation, North Vancouver (CA)

( * ) Notice: Subject to any disclaimer, the term of this patent is extended or adjusted under 35 U.S.C. 154(b) by 20 days.

(21) Appl. No.: 16/073,567

(22) PCT Filed: Jan. 27, 2017

(86) PCT No.: PCT/CA2017/050094
§ 371 (c)(1),
(2) Date: Jul. 27, 2018

(87) PCT Pub. No.: WO2017/127936
PCT Pub. Date: Aug. 3, 2017

(65) Prior Publication Data
US 2019/0048437 A1 Feb. 14, 2019

Related U.S. Application Data

(60) Provisional application No. 62/288,884, filed on Jan. 29, 2016.

(51) Int. Cl.
| | | |
|---|---|---|
| C22B 26/10 | (2006.01) |
| C01D 17/00 | (2006.01) |
| C22B 3/08 | (2006.01) |
| C22B 3/44 | (2006.01) |
| C22B 3/22 | (2006.01) |
| C01F 11/46 | (2006.01) |

(Continued)

(52) U.S. Cl.
CPC .............. *C22B 26/10* (2013.01); *C01D 17/00* (2013.01); *C01F 7/34* (2013.01); *C01F 7/76* (2013.01); *C01F 11/462* (2013.01); *C22B 3/08* (2013.01); *C22B 3/22* (2013.01); *C22B 3/44* (2013.01); *Y02P 10/234* (2015.11)

(58) Field of Classification Search
None
See application file for complete search history.

(56) References Cited

U.S. PATENT DOCUMENTS 2,808,313 A  10/1957 Julius
3,112,169 A  11/1963 Berthold et al.
(Continued)

FOREIGN PATENT DOCUMENTS

WO   WO-2014/137785 A1   9/2014

*Primary Examiner* — Melissa S Swain
(74) *Attorney, Agent, or Firm* — Mintz Levin Cohn Ferris Glovsky and Popeo, P.C.

(57) ABSTRACT

Hydrometallurgical processes are provided for the recovery of metal values, including cesium, from epithermal mineral deposits, including pharmacosiderite-containing ores. Aspects of the process involve the preferential formation of a cesium alum, and preparation of cesium hydroxide from the cesium alum.

28 Claims, 1 Drawing Sheet

(51) Int. Cl.
*C01F 7/76* (2006.01)
*C01F 7/34* (2006.01)

(56) References Cited

U.S. PATENT DOCUMENTS

| | | | | |
|---|---|---|---|---|
| 3,207,571 | A | * | 9/1965 | Berthold ................ C01D 17/00 |
| | | | | 423/202 |
| 3,322,531 | A | | 5/1967 | Tepper |
| 4,469,670 | A | | 9/1984 | Mein |
| 4,597,955 | A | | 7/1986 | Mein |
| 5,900,221 | A | | 5/1999 | Hoffman et al. |
| 6,015,535 | A | | 1/2000 | Brown et al. |
| 6,436,879 | B1 | * | 8/2002 | Brown ................... C01D 17/00 |
| | | | | 507/103 |
| 6,652,820 | B2 | | 11/2003 | Bakke |
| 7,323,150 | B2 | | 1/2008 | Bakke et al. |
| 9,045,812 | B2 | | 6/2015 | Bakke et al. |
| 2004/0253157 | A1 | * | 12/2004 | Bakke ....................... C22B 3/44 |
| | | | | 423/193 |
| 2008/0166281 | A1 | | 7/2008 | Harms et al. |

\* cited by examiner

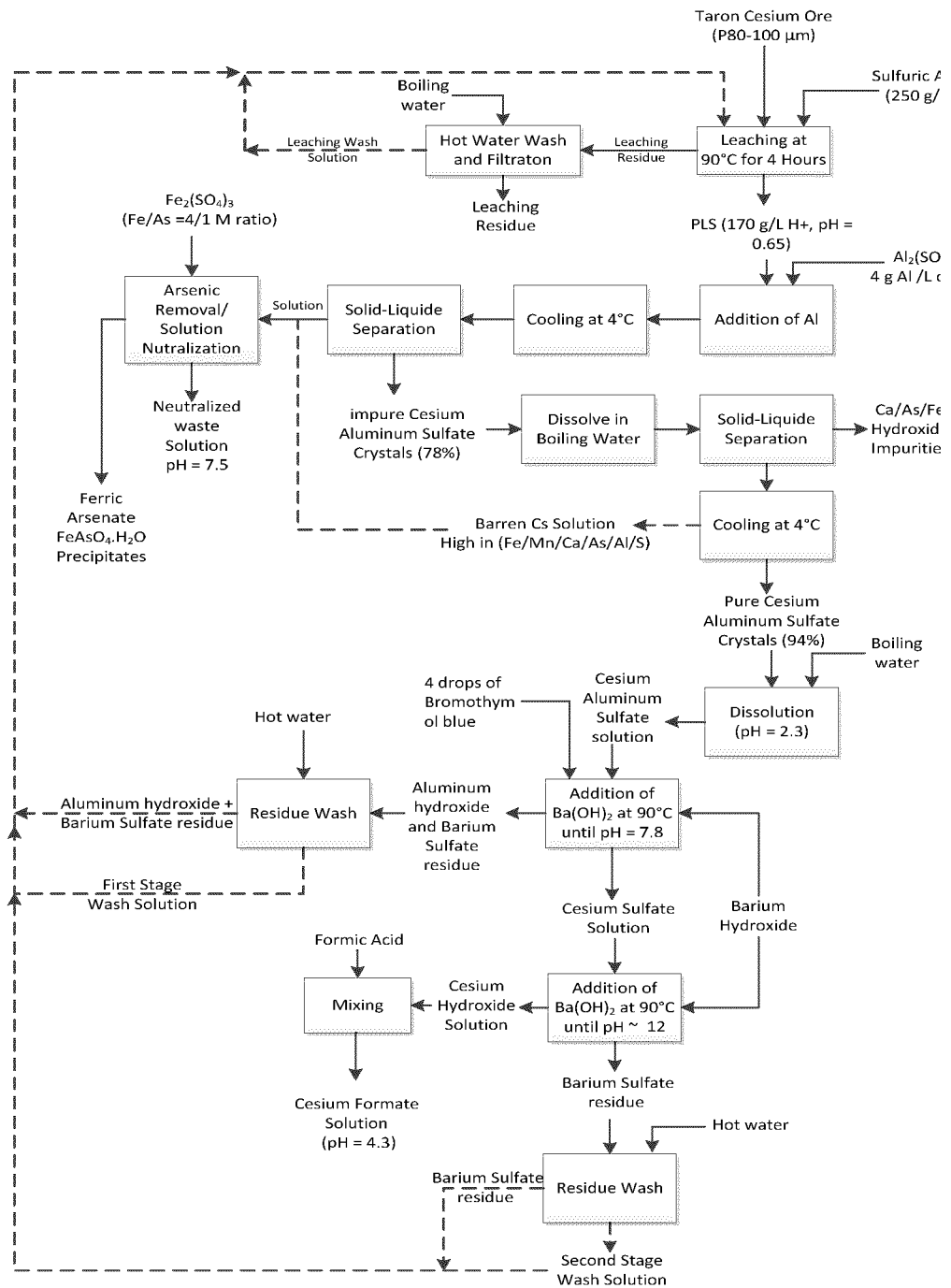

RECOVERY OF CESIUM FROM EPITHERMAL MINERAL DEPOSITS

FIELD OF THE INVENTION

The invention pertains to hydrometallurgical processes for the recovery of metal values, including cesium, from epithermal mineral deposits, including pharmacosiderite-containing ores.

BACKGROUND OF THE INVENTION

The concentration of cesium in the earth's crust is understood to be approximately 3 ppm by weight. Economic ores of cesium are seldom found in nature, and may for example include the minerals analcime, cesium-thallium arsenic sulfosalts (thioarsenates), and cryptomelane group minerals. An economically important ore source mineral for caesium is pollucite ($Cs(AlSi_2O_6)$), but economic sources of pollucite are rarely found in nature. One such deposit is the Bernic Lake Deposit in Manitoba, Canada, which contains pollucite that has been mined and processed for cesium recovery. Processes for recovering cesium from a cesium ore such as pollucite are for example described in U.S. Pat. Nos. 2,808,313, 3,112,169, 3,207,571, 3,322,531, 4,597,955, 5,900,221, 7,323,150 and 9,045,812. The processing of cesium alums is for example discussed in U.S. Pat. Nos. 4,469,670, 6,015,535, 6,436,879, and 6,652,820.

The shortage of economic deposits of cesium has led to a long felt need for new sources of cesium to be identified.

SUMMARY OF THE INVENTION

Aspects of the invention involve acid hydrometallurgical processes for the recovery of cesium, and production of cesium compounds, from epithermal geological deposits. These deposits may for example include geyserite, travertine tufa, opaline silica, variants of cryptocrystalline quartz, sinters, cementitious devitrified clay minerals, as well as clays in company with and, or enriched by microbial and/or bacterial activities.

Aspects of the invention involve the direct extraction and recovery of cesium from a complex ore using an acid leach followed by treatment of the leachate for cesium recovery. In a select embodiment, the ore may for example have characteristics of the mineralogy found in the Taron deposit in Argentina. Deposits of this kind may for example contain various minerals including pharmacosiderite, and various elements, including cesium. An aspect of the invention involves the recognition that the Taron deposit contains accessible cesium values in a pharmacosiderite containing mineral system. Pharmacosiderite has the chemical formula $KFe_4(AsO_4)_3(OH)_4 \cdot (6\text{-}7)H_2O$. In alternative aspects of the invention, cesium may for example exist partly in pharmacosiderite, for example as a cesium analogue of pharmacosiderite, with Cs replacing K, and partly in other complex oxides, arsenates, manganates, chlorides, silicates, thallates, sulphates, hydrates, or other minerals in a deposit of interest. Table 1 provides a non-limiting list of minerals that may be present in ores amenable to treatment in alternative aspects of the invention.

TABLE 1

| | Minerals |
|---|---|
| Psilomelane | $Ba \cdot (H_2O)Mn^{3+}{}_5O_{10}$ |
| Coronadite | $Pb_{1.1}Ba_{0.1}Mn^{4+}{}_{7.2}Mn^{2+}{}_{0.5}V^{5+}{}_{0.2}Al_{0.1}O_{16}$ |
| Hollandite | $Ba_{0.8}Pb_{0.2}Na_{0.1}Mn^{4+}{}_{6.1}Fe^{3+}{}_{1.3}Mn^{2+}{}_{0.5}Al_{o.2}Si_{0.1}O^{16}$ |
| Romanechite | $Ba_{0.7}Mn^{3+}{}_{4.8}Si_{0.1}O_{10} \cdot 1.2(H_2O)$ |
| Cryptomelane, and cryptomelane group minerals | $KMn^{4+}{}_6Mn^{2+}{}_2O_{16}$ |
| Ludlockite | $Fe^{2+}{}_{0.95}Pb_{0.05}As_2O_6$ |
| Wallkilldellite | $Ca_4Mn^{2+}{}_6As_4O_{16}(OH)_8 \cdot 18(H_2O)$ |
| Pharmacosiderite | $KFe^{3+}{}_4(AsO_4)_3(OH)_4 \cdot 7(H_2O)$ |
| Yukonite | $Ca_7Fe_{11}(AsO_4)_9 \cdot 24H_2O$ |
| Cesian opal | $SiO_2$ |
| Chalcedony | $SiO_2$ |
| analcime | $NaAlSi_2O_6 \cdot H_2O$ |
| thioarsenates | Salts or esters containing pentavalent arsenic and sulfur |

In selected embodiments, the first step in the process is the extraction (leaching) of cesium using a hot acid leach of ground ore slurry. The cesium-containing leachate is separated from the leach residue by a method of solid-liquid separation. Following acid extraction the leachate is then treated with an aluminum salt in the presence of sulphate to favour the formation of cesium alum $CsAl(SO_4)_2 \cdot 12H_2O$ upon cooling of the solution. The cesium alum is separated from the mother liquor and excess solution removed by methods such as centrifugation. The cesium alum is then directed to a purification and cesium recovery process.

The first step of the purification process is the re-dissolution of cesium from the cesium alum by stirring with hot water. The cesium alum is much more soluble at higher temperature and therefore the cesium is re-dissolved. Other solids that may have formed with the cesium alum remain substantially undissolved and may be separated from the cesium-containing re-leachate. The cesium alum re-leachate is then treated by addition of more aluminum sulphate and cooled to reform purified cesium alum.

The purified cesium alum is then re-dissolved in a minimum amount of hot water. The cesium alum solution is purified by barium hydroxide addition to precipitate in two steps aluminum hydroxide and barium sulphate. The aluminum hydroxide is removed first and then the barium sulphate is removed. The final product of addition of barium hydroxide to the cesium alum solution is a solution of cesium hydroxide.

The cesium hydroxide solution is a precursor to forming a variety of cesium salt solutions. For example, if formic acid is added to the solution, cesium formate solution may be produced. Cesium formate may then be crystallized and recovered from the solution by, for example, evaporative crystallization. Similarly salts such as cesium chloride, cesium nitrate, cesium sulphate and cesium carbonate may be formed by addition of hydrochloric acid, nitric acid, sulphuric acid or carbon dioxide respectively to the cesium hydroxide solution.

The barren solution formed from the first cesium alum precipitation process contains residual sulphuric acid, arsenic, iron and other dissolved species. The elements Rb and Tl are often present in Cs containing pharmacosiderite-bearing ores, and in that circumstance these elements may accordingly be recovered in alternative embodiments of the process as co-products with the Cs. This solution may be partially recycled to leaching to increase the utilization of acid. The balance of the solution must be treated for environmental stabilization. This may be done by a number of methods. For example, iron sulphate salt may be added to the barren solution followed by pH adjustment by addition of limestone (calcium carbonate). Under these conditions, iron and arsenic and other species will precipitate as iron hydroxide and iron-arsenate co-precipitation products. Further addition of additional base, for example lime, calcium oxide, calcium hydroxide or sodium hydroxide, will further increase the pH of the solution and remove other metals as metal hydroxides.

The leach residue from the primary ore leach can optionally be chemically stabilized.

The intermediate solids formed by purification of the first cesium alum may be recycled to the primary leach process to increase the overall recovery of cesium and/or can be chemically stabilized.

The chemistry of the cesium recovery process with an acid leachant can be illustrated by the following reactions. The reactions are written in simplified form to illustrate the chemistry. The actual ore mineralogy and elemental composition is of course much more complicated than can be represented by simplified chemical reactions.

Acid Leaching $$Cs_2O(s)+H_2SO_4(aq)=Cs_2SO_4(aq)+H_2O$$

$$CsCl(s)=CsCl(aq)$$

$$K_2O(s)+H_2SO_4(aq)=K_2SO_4(aq)+H_2O$$

$$KCl(s)=KCl(aq)$$

$$Na_2O(s)+H_2SO_4(aq)=Na_2SO_4(aq)+H_2O$$

$$NaCl(s)=NaCl(aq)$$

$$Rb_2O(s)+H_2SO_4(aq)=Rb_2SO_4(aq)+H_2O$$

$$RbCl(s)=RbCl(aq)$$

$$Tl_2O(s)+H_2SO_4(aq)=Tl_2SO_4(aq)+H_2O$$

$$TlCl(s)=TlCl(aq)$$

$$KFe_4(AsO_4)_3(OH)_4 \cdot (6\text{-}7)H_2O(s)+6.5H_2SO_4(aq)= \\ 0.5K_2SO_4(aq)+2Fe_2(SO_4)_3(aq)+3H_3AsO_4(aq)+ \\ (10\text{-}11)H_2O$$

$$Fe_2O_3(s)+3H_2SO_4(aq)=Fe_2(SO_4)_3(aq)+3H_2O$$

$$Al_2O_3(s)+3H_2SO_4(aq)=Al_2(SO_4)_3(aq)+3H_2O$$

$$CaO(s)+H_2SO_4(aq)+H_2O=CaSO_4 \cdot 2H_2O(s)$$

$$MgO(s)+H_2SO_4(aq)=MgSO_4(aq)+H_2O$$

$$CuO(s)+H_2SO_4(aq)=CuSO_4(aq)+H_2O$$

$$ZnO(s)+H_2SO_4(aq)=ZnSO_4(aq)+H_2O$$

$$MnO(s)+H_2SO_4(aq)=MnSO_4(aq)+H_2O$$

Cesium Alum Formation $$Cs_2SO_4(aq)+Al_2(SO_4)_3(aq)+24H_2O=_2CsAl(SO_4)_2 \cdot 12H_2O(s)$$

Cesium Alum Redissolution $$2CsAl(SO_4)_2 \cdot 12H_2O(s)=Cs_2SO_4(aq)+Al_2(SO_4)_3(aq)+ \\ 24H_2O$$

Cesium Alum Treatment with Barium Hydroxide $$Cs_2SO_4(aq)+Al_2(SO_4)_3(aq)+3Ba(OH)_2(aq)=Cs_2SO_4 \\ (aq)+2Al(OH)_3(s)+3BaSO_4(s) \quad \text{Step 1:}$$

$$Cs_2SO_4(aq)+Ba(OH)_2(aq)=2CsOH(aq)+BaSO_4(s) \quad \text{Step 2:}$$

Cesium Formate Formation $$CsOH(aq)+CH_2O_2(s)=CsCHO_2(aq)+H_2O$$

Cesium Formate Crystallization $$CsCHO_2(aq)=CsCHO_2(s)$$

Precipitation of Arsenic and Other Metals from the Cesium Alum Barren Solution $$3Fe_2(SO_4)_3(aq)+9CaCO_3(s)+H_3AsO_4(aq)+ \\ 26H_2O=_5Fe(OH)_3(s)+FeAsO_4 \cdot 2H_2O(s)+ \\ 9CaSO_4 \cdot 2H_2O(s)+9CO_2(g)$$

$$Al_2(SO_4)_3(aq)+3CaCO_3(s)+21H_2O=_2Al(OH)_3(s)+ \\ 9CaSO_4 \cdot 2H_2O(s)+3CO_2(g)$$

$$CuSO_4(aq)+CaCO_3(s)+3H_2O=Cu(OH)_2(s)+ \\ CaSO_4 \cdot 2H_2O(s)+CO_2(g)$$

$$ZnSO_4(aq)+CaCO_3(s)+3H_2O=Zn(OH)_2(s)+ \\ CaSO_4 \cdot 2H_2O(s)+CO_2(g)$$

$$MnSO_4(aq)+CaO(s)+3H_2O=Mn(OH)_2(s)+ \\ CaSO_4 \cdot 2H_2O(s)$$

BRIEF DESCRIPTION OF THE DRAWINGS

FIG. 1 is a schematic flowsheet showing aspects of a process for acid leaching of cesium, exemplified by an ore containing pharmacosiderite.

DETAILED DESCRIPTION OF THE INVENTION

Aspects of the process are illustrated schematically in FIG. 1. Typically, the mined ore derived from an epithermal mineral deposit containing cesium, such as a pharmacosiderite-containing ore, is optionally reduced in size prior to hydrometallurgical extraction. The leaching process may also be applied to a concentrate that is recovered from the ore using physical or chemical concentration methods.

In non-limiting alternatives, there are three broad particle size ranges that may for example be engineered in order to use (1) heap or dump leaching, (2) vat leaching or (3) stirred reactor leaching. Heap or dump leaching may for example be performed using material crushed to a P80 (product size is 80% passing the nominal size listed) of ⅛ inch to greater than 1 inch. Vat leaching may for example be performed using material crushed (and optionally ground for the finer size range) to a P80 of 0.2 inch (0.5 mm) to greater than 1 inch. Stirred reactor leaching may for example be performed using material crushed and ground to a P80 of less than 0.2 inch. Crushing is generally conducted without water addition but optionally 'water-flush' crushing may be used to elutriate the fine materials formed during the crushing operation. In this way the fine material may be separately treated from the coarse material. Grinding is generally conducted with water addition. Water addition for grinding may for example be obtained from available fresh water, brackish water, recycle of neutral chloride-containing solutions or any other source. In one aspect the particle size range of the ground ore may be chosen to obtain the best recovery of cesium in the leaching process, for example the range P80 of 100 microns for leaching with sulphuric acid.

The leaching of the ore is generally conducted in heaps, vats or in a series of stirred reactors. The leaching of ore in heaps, vats or stirred tanks may for example be performed by applying a leach solution containing an acid, such as sulphuric acid. In some embodiments, acid addition may for example comprise 100-250 g/L of $H_2SO_4$ and the temperature may for example be from ambient (~25° C.) to the boiling point (which will of course vary with altitude, or applied pressure). In alternative implementations, the time for extraction will vary from a few hours to days to months to years, depending for example on the particle size, mineralogy and rate of extraction and economics of continuing leaching.

The leachate obtained from leaching may be recovered and directed to cesium alum formation. The leached ore may be washed in order to recover retained leach solution containing dissolved cesium and other metals and residual reagents (acid).

The leaching of ore in an agitated tank (i.e. stirred reactor) may for example be performed by mixing the ground ore slurry with the leach solution containing acid. At the conclusion of agitated tank leaching, the leached solids may be separated and washed using for example counter-current thickening and washing or filtration.

The leached solids from heap, vat or agitated tank leaching may be treated with chemical or physical processes in order to render the materials acceptable for environmental disposal.

The leachate, for example obtained from the heap/dump, vat or agitated tank acid leaching process, will contain dissolved metals (for example, cesium, iron, aluminum, copper, zinc, manganese, magnesium) and typically some residual acid. The precipitation of cesium is accomplished by adding soluble aluminum sulphate (or other aluminum salts provided there is enough sulphate in the system to form the cesium alum). After addition of aluminum to the cesium-containing leachate, the temperature is reduced to provide a temperature and conditions that favour the removal of cesium from solution as cesium alum over the formation of other solid alkali metal alums, such as rubidium alum and potassium alum. In a typical embodiment, this may involve 2-8 g/L of Al addition, and the temperature may for example be cooled to a temperature ranging from the freezing point of the leachate, which will be depressed by dissolved salts, for example from −10 to 0° C., up to an upper cesium alum formation temperature, for example in the range of about 40° C., with lower temperatures generally favoured in this range (−10° C. to 40° C.), and with regard to the differential solubility of alkali metal alums at varying temperatures as shown in Table 2, and also in keeping with the surprising finding that the solubility of cesium alum is lowered, compared to its solubility in water alone, in the presence of other dissolved salts and acids in the primary leachate. The resulting effect in the context of aspects of the invention is that the recovery of cesium alum in the solid phase from the leachate may be made to be much higher than would be obtained from water. For example, cesium alum crystallized unexpectedly when a fresh acid leachate with 1.4 g/L cesium was cooled from 90° C. to 20° C.

TABLE 2

Alum solubilities in g of anhydrous alum per 100 mL of water.

| T ° C. | Potassium alum | Rubidium alum | Cesium alum |
|---|---|---|---|
| 0 | 3.90 | 0.71 | 0.19 |
| 10 | 9.52 | 1.09 | 0.29 |
| 50 | 44.11 | 4.98 | 1.235 |
| 80 | 134.47 | 21.60 | 5.29 |
| 100 | 357.48 | | |

The time to precipitate cesium alum may for example be from 1 hour to 1 week. The time for precipitation of cesium may be reduced by employing crystallization technology such as seeding by adding some of the same solid so as to increase surface area for particle growth to provide an increased precipitation rate.

The cesium alum may be recovered from the crystallizer slurry by a solid-liquid separation step. Cesium alum is water-soluble, so any washing of the alum is advantageously carried out so as to avoid re-solubilisation of the cesium alum. For example, in some embodiments, a minimal amount of washing may be carried out, and the wash water returned to the crystallizer feed. To recover the solid cesium alum, centrifugation or similar solid/liquid separation technologies may be used to remove free solution away from the recovered solids.

In alternative embodiments, processes may be provided for recovering rubidium and/or thallium. For example, conditions may be used under which Rb will follow the Cs in the formation of the first alum, and a Rb recovery process may accordingly be implemented in the context of the re-leaching and treatment of the first Cs alum. Aspects of such a process may involve repeated re-dissolving and re-precipitation of the alum, so that the remaining solution is enriched in Rb. As such, the Rb recovery can then be by a method analogous to Cs recovery, involving Rb alum formation, re-dissolution and treatment with $Ba(OH)_2$ in two steps.

In a subsequent purification and cesium recovery process, the cesium alum may then be dissolved in hot water. The solubility of cesium alum increases with increasing temperature. The solubility of cesium alum may be approximated as 0.19 g per 100 mL of water at 0° C., rising to 5.29 g per 100 ml of water at 80° C. Surprisingly, it has been found in this work that the solubility of cesium alum is lowered in the presence of other dissolved salts and acids in the primary leachate. In some embodiments, the dissolution may be relatively fast (for example taking less than 1 hour), and this may be facilitated by carrying out the re-dissolution with mixing and heating of the aqueous solution to a relatively high temperature, for example 80-100° C.).

The cesium alum re-dissolution slurry may be treated to remove insoluble intermediate solids from the system. These solids may for example include silica or gypsum or other solids that may form on cooling of the primary solution to form the original cesium alum.

The cesium alum re-dissolution solution may then be treated by adding soluble aluminum sulphate (or other aluminum salts under conditions where there is enough sulphate in the system to form the cesium alum). After addition of the aluminum salt to the cesium-containing leachate, the temperature is advantageously reduced, for example to a temperature that is as low as possible to favour the removal of cesium from solution as cesium alum. In select embodiments, a typical range of parameters for this step is 2-8 g/L of aluminum sulphate addition, with the temperature cooled to about the freezing point to 40° C., with lower temperatures favoured in this range in some embodiments. In alternative embodiments, the time to precipitate cesium may for example be from 1 hour to 1 week. The time for precipitation of cesium may for example be reduced by employing a crystallization-enhancement technology, for example through use of seeding by adding some solid cesium alum so as to increase surface area for solid cesium alum particle growth to provide an increased precipitation rate. The cesium alum precipitate may again be recovered from solution using a suitable solid-liquid separation method, such as filtration or thickening and or centrifugation.

The cesium alum precipitate may be re-dissolved in a heated aqueous purification solution, for example in a minimum amount of hot water, to form a cesium-aluminum-sulphate purification solution. The removal of aluminum may then be performed, for example by first adding a solution of barium hydroxide to precipitate the aluminum as aluminum hydroxide, and then associated sulphate as barium sulphate. The amount of barium hydroxide to be added is advantageously stoichiometric with the aluminum sulphate in the original solution. After this first addition of barium hydroxide, carried out for example at pH~7 with heating so as to maintain cesium solubility. The aluminum hydroxide and barium sulphate precipitate should then be removed from the solution, to provide an aluminum-free or aluminum-depleted cesium solution.

The aluminum-free cesium solution may then be treated with a further increment of barium hydroxide solution so as to convert the cesium sulphate to cesium hydroxide. In this step, the stoichiometric addition of barium hydroxide is advantageous.

A mineral acid or carbon dioxide may be added to the cesium hydroxide solution, to provide a mineral salt of cesium. The mineral acid may for example be hydrochloric acid, nitric acid, sulphuric acid or carbonic acid (i.e. carbon dioxide), and the mineral salt of cesium may correspondingly be a cesium chloride, cesium nitrate, cesium sulphate or cesium carbonate.

In every step herein where there is a precipitation, it will generally be advantageous to seed the precipitation by recycling a portion of the solids back to the start of the precipitation process. In this way, each precipitate may be made to grow to a coarser size and will accordingly become easier to settle, if thickened, or to filter and wash.

Example

FIG. 1 shows a conceptual flow chart of the exemplified process with an acid leachate, in which dashed lines show potential recycle streams. Each unit operation was tested (conditions shown) but no recycles were included in the exemplified embodiment. As illustrated, starting from cesium ore, atmospheric sulfuric acid leaching at 90° C. was applied to dissolve the cesium and other valuable metals into solution. After leaching, aluminum sulfate was added to the PLS (Pregnant Leach Solution) which was then stored in a refrigerator for 7-days. Cesium precipitated out of solution in the form of impure aluminum cesium sulfate crystals during this period. Afterwards, the liquid phase was removed, and the cesium containing crystals were left to air dry. Surprisingly, it was discovered that the solubility of cesium alum is lowered, compared to the solubility in water alone, in the presence of the other dissolved salts and acids in the primary leachate, with the resulting effect that the recovery of cesium alum in the solid phase from the leachate may be made to be much higher than would be obtained from water. For example, in a select embodiment, cesium alum crystallized unexpectedly when a fresh acid leachate with 1.4 g/L cesium was cooled from 90° C. to 20° C.

Following the initial precipitation and separation of impure aluminum cesium sulphate crystals, these crystals were re-dissolved in boiling water. The resultant solution was filtered and returned to the refrigerator for re-crystallization. This process purified the initially collected crystals. After another 10-days in the fridge, the solution was decanted, and the crystals were filtered from the solution. These purified aluminum cesium sulfate crystals were dissolved in water, and barium hydroxide was added in two stages with two filtrations. The addition of barium hydroxide to the dissolved cesium aluminum sulfate precipitated the aluminum and barium and converted the cesium into cesium hydroxide. Formic acid was then added to the collected solution producing cesium formate. The extraction and recovery of cesium throughout this overall procedure was about 91%. Detailed results for each process step are summarized below.

The exemplified procedure had three stages: leaching and crystal formation, crystal purification, and cesium sulfate purification, and the corresponding recoveries of cesium were 94.7%, 99.9%, and 96.1%, respectively. This gives a total of 90.9% cesium recovery over the entire process assuming all wash solutions are recycled. The procedure described herein converted the ore (in this case a pharmacosiderite ore from the Taron deposit in Argentina) containing 4.6 grams of cesium per kilogram of ore into a purified cesium aluminum sulfate crystal with 148.2 grams of cesium per kilogram of purified crystal.

As depicted in FIG. 1, all wash solutions and two of the residues (the barium sulfate and aluminum hydroxide residues) may be recycled in alternative aspects of the process. All wash solutions may also be concentrated by heating and evaporation, or other methods known to the art. In select embodiments, all other solid residues generated during the process have a cesium content of less than 10 wt % of the mineral ore. In select embodiments of the process, these solids may report to waste disposal after neutralization.

Table 3 summarizes the concentration of the main components in each process step of the exemplified process from start to end, with Table 3A illustrating one set of elements for each step and Table 3B illustrating a different set of elements for each of the same steps.

TABLE 3A

Concentration of select components, Al, As, Ba, Ca, Cs, Cu, Fe, in each process step from the beginning to end, values in ppm (wt):

| Step | Al | As | Ba | Ca | Cs | Cu | Fe |
|---|---|---|---|---|---|---|---|
| Taron cesium ore (P80-100 μm) | 49300 | 40495 | 2419 | 29300 | 4619 | 1549 | 68800 |
| PLS (170 g/L H+, pH = 0.65) | 2380 | 12392 | 0.192 | 600 | 1387 | 283 | 16808 |
| Leaching residue | 48700 | 2275 | 3294 | 31400 | 332 | 805 | 20300 |
| Leaching wash solution | 792 | 4060 | 0.175 | 824 | 428 | 96 | 5156 |

TABLE 3A-continued

Concentration of select components, Al, As, Ba, Ca, Cs, Cu, Fe, in each process step from the beginning to end, values in ppm (wt):

| Step | Al | As | Ba | Ca | Cs | Cu | Fe |
|---|---|---|---|---|---|---|---|
| Impure AlCs(SO$_4$)$_2$ (4 g/L Al, 7 days in fridge 4° C. Solid | 25100 | 10477 | 12 | 46900 | 94134 | 303 | 23500 |
| Impure AlCs(SO$_4$)$_2$ Solution | 5517 | 10393 | 0.429 | 347 | 13 | 228 | 13907 |
| FeAsO$_4$•H$_2$O precipitates (Fe and Ca added) | 4400 | 20700 | 15 | 247500 | 573 | 558 | 62200 |
| Neutralized waste solution pH = 7.5 | 0.600 | 0.018 | 0.332 | 446 | 938 | 0.351 | 10 |
| Wash | 0.600 | 1.095 | 0.082 | 575 | 193 | 0.496 | 10000 |
| Impure crystal dissolved in water | 912 | 217 | 2 | 889 | 4055 | 8 | 593 |
| Ca/As/Fe hydroxide impurities | 22 | <3 | 0 | 627 | 133 | 0 | <10 |
| Barren Cs solution high in (Fe/Ca/As/Al/S) | 316 | 205 | 0 | 816 | 297 | 8 | 346 |
| Pure AlCs(SO$_4$)$_2$•12H$_2$O (94%) | 39200 | 24 | 45 | <100 | 148187 | 2 | 13400 |
| Cesium solution from pure crystals | 902 | <3 | <0.08 | 48 | 4885 | <0.08 | 65 |
| Cesium sulfate solution (Ba added) | 1 | <3 | <0.08 | 15 | 6265 | <0.08 | <10 |
| Al hydroxide + Ba sulfate residue | 51400 | 66 | 480800 | 4100 | 7159 | 3 | 17400 |
| First stage wash solution | <0.6 | <3 | 0 | 2 | 291 | <0.08 | <10 |
| Cesium hydroxide solution (Ba added) | 1 | <3 | 0 | 2 | 7471 | <0.08 | <10 |
| Barium sulfate residue | I.S. | 477600 | I.S. | I.S. | 1036 | I.S. | I.S. |
| Second stage wash solution | <0.6 | <3 | 1 | 1 | 318 | <0.08 | <10 |
| Cesium formate solution H$_2$CO$_2$ added | 2 | <3 | 0 | 3 | 6733 | <0.08 | <10 |

TABLE 3B

Concentration of select components, K, Mg, Mn, Na, Rb, S, Tl, Zn, in each process step from the beginning to end, values in ppm (wt):

| | K | Mg | Mn | Na | Rb | S | Tl | Zn |
|---|---|---|---|---|---|---|---|---|
| Taron cesium ore (P80-100 μm) | 19700 | 4600 | >10000 | 15150 | 483 | 200 | 2725 | 2270 |
| PLS (170 g/L H+, pH = 0.65) | 863 | 0.883 | 2625 | 462 | 109 | 74316 | 197 | 489 |
| Leaching residue | 19000 | 2500 | >10000 | 16200 | 144 | 17000 | 2736 | 841 |
| Leaching wash solution | 287 | 0.281 | 911 | 1341 | 35 | 29038 | 53 | 163 |
| Impure AlCs(SO$_4$)$_2$ (4 g/L Al, 7 days in fridge 4° C. Solid | 3000 | 700 | 2394 | 300 | 5273 | 184000 | 150 | 539 |
| Impure AlCs(SO$_4$)$_2$ Solution | 722 | 0.711 | 219 | 386 | 29 | 71382 | 143 | 364 |
| FeAsO$_4$•H$_2$O precipitates (Fe and Ca added) | 300 | 200 | 1879 | 100 | 49 | >100000 | 296 | 830 |
| Neutralized waste solution pH = 7.5 | 665 | 0.798 | 1554 | 384 | 82 | 2864 | 3 | 58 |
| Wash | 142 | 0.147 | 352 | 70 | 17 | 1028 | 3 | 18 |
| Impure crystal dissolved in water | 72 | 0.023 | 0.073 | 14 | 0.205 | 6384 | 0.003 | 0 |
| Ca/As/Fe hydroxide impurities | 3 | <1 | 2 | <1 | 7 | 722 | <3 | 0 |

TABLE 3B-continued

Concentration of select components, K, Mg, Mn, Na, Rb, S, Tl, Zn,
in each process step from the beginning to end, values in ppm (wt):

|  | K | Mg | Mn | Na | Rb | S | Tl | Zn |
|---|---|---|---|---|---|---|---|---|
| Barren Cs solution high in (Fe/Ca/As/Al/S) | 63 | 22 | 76 | 13 | 170 | 4271 | 3 | 15 |
| Pure $AlCs(SO_4)_2 \cdot 12H_2O$ (94%) | <100 | <100 | 6 | <0.01 | 1106 | 106000 | 7 | 12 |
| Cesium solution from pure crystals | 4 | <1 | 0 | <1 | 33 | 2944 | <3 | <0.3 |
| Cesium sulfate solution (Ba added) | 7 | <1 | <0.05 | <1 | 35 | 933 | <3 | <0.3 |
| Al hydroxide + Ba sulfate residue | <0.01 | <100 | 7 | <0.01 | 235 | 6000 | 5 | 61 |
| First stage wash solution | <1 | <1 | <0.05 | <1 | 2 | 75 | <3 | <0.3 |
| Cesium hydroxide solution (Ba added) | 11 | <1 | <0.05 | 2 | 43 | 218 | <3 | <0.3 |
| Barium sulfate residue | I.S. | I.S. | I.S. | I.S. | I.S. | I.S. | I.S. | I.S. |
| Second stage wash solution | <1 | <1 | <0.05 | <1 | 2 | 13 | <3 | <0.3 |
| Cesium formate solution $H_2CO_2$ added | 7 | <1 | 0 | 2 | 0 | 898 | <3 | <0.3 |

Table 4 summarizes cesium recovery rates in an exemplified embodiment in successive stages calculated in two ways: considering cesium loss as the cesium lost to the solid form, or as the cesium lost to the solids and wash solution. In alternative embodiments, the cesium lost to the wash would be recovered after further processing. Table 4 summarizes the recovery from three stages of an exemplified embodiment: leaching, purification of the crystals, and purification with barium hydroxide, as well as a total recovery of the entire process. In alternative embodiments, the process may be adapted to provide total cesium recoveries of, for example, at least: 60%, 70%, 80%, 90%, 65% or 99%, or any integer value within the range of 60% to 99%.

TABLE 4

Cesium Recovery

| Cesium Recovery (%) | Leaching | Crystal Formation | Crystal Purification | Barium Hydroxide Purification | Total Recovery |
|---|---|---|---|---|---|
| (Solid Lost) | 94.7 | N/A | 99.9 | 96.1 | 90.9 |
| (Solid + Wash Lost) | 85.7 | 98.9 | 92.5 | 86.4 | 67.8 |

Table 5 summarizes leaching efficiencies for a number of elements of interest in an exemplified embodiment, showing that 94.7% of the cesium in the ore was leached into the PLS (pregnant leaching solution) during a four-hour leach in 250 g/L $H_2SO_4$ at 90° C. for 4 hours.

TABLE 5

Leaching Efficiencies

| Element | Al | As | Cs | Fe | Rb | Tl |
|---|---|---|---|---|---|---|
| Recovery (%) | 17.5 | 95.9 | 94.7 | 78.1 | 76.6 | 23.5 |

The invention claimed is:

1. A process for extracting cesium from an ore, or a concentrate of the ore, wherein the ore is derived from an epithermal mineral deposit comprising pharmacosiderite, Cs, Rb and K, the process comprising:
   leaching the ore with an acid in a heated leaching solution, to produce a cesium-containing leachate;
   separating the liquid cesium-containing leachate from a solid leach residue by solid-liquid separation;
   treating the liquid leachate solution with an aluminum salt and cooling the solution, to provide conditions in a mother liquor that favour the formation of a cesium alum precipitate over the formation of other solid alkali metal alums in the mother liquor, wherein the solubility of the cesium alum precipitate is lowered in the liquid leachate, compared to cesium alum solubility in water alone;
   separating the cesium alum from the mother liquor, leaving a cesium-alum-barren solution; and,
   directing the cesium alum to a purification and cesium recovery process.

2. The process of claim 1, wherein the acid is sulphuric acid.

3. The process of claim 1, where the aluminum salt is aluminum sulphate.

4. The process of claim 1, wherein the leaching of the ore with the acid is carried out above ambient temperature and at or below the boiling point of the leaching solution under the prevailing pressure.

5. The process of claim 1, wherein the leaching is by heap or dump leaching, vat leaching or stirred reactor leaching.

6. The process of claim 1, wherein the ore further comprises an additional chemical component that is arsenic, silicon, iron, aluminum, copper, zinc, manganese, or magnesium, and wherein one or more of the additional metal species report to the cesium-containing leachate.

7. The process of claim 1, wherein the step of forming a cesium alum further comprises seeding the liquid leachate solution with solid cesium alum.

8. The process of claim 7, wherein separating the cesium alum from the mother liquor is carried out by centrifugation.

9. The process of claim 1, wherein the epithermal mineral deposit comprises: geyserite, travertine tufa, opaline silica, variants of cryptocrystalline quartz, sinters, cementitious devitrified clay minerals, and clays enriched by microbial activities.

10. The process of claim 1, wherein the epithermal mineral deposit comprises one or more of: psilomelane, coronadite, hollandite, romanechite, cryptomelane, ludlockite, wallkilldellite, yukonite, cesian opal, chalcedony, analcime, cesiumthalium arsenic sulfosalts (thioarsenates), or cryptomelane group minerals.

11. The process of claim 1, wherein the purification and cesium recovery process comprises:
re-dissolving cesium from the cesium alum by stirring in a heated aqueous solution to provide a cesium-containing re-leachate, under conditions wherein other solids that have formed with the cesium alum remain substantially undissolved as an intermediate solid;
separating the intermediate solid from the cesium-containing re-leachate;
treating the cesium-containing re-leachate with a soluble aluminum salt in the presence of sulphate, and cooling, to form a purified cesium alum; and,
recovering the purified cesium alum by solid-liquid separation.

12. The process of claim 11, wherein the heated aqueous solution is heated to 80-100° C.

13. The process of claim 11, wherein the intermediate solids comprise silica and/or gypsum.

14. The process of claim 11, wherein the aluminum salt is aluminum sulphate.

15. The process of claim 11, wherein cooling to form the purified cesium alum comprises lowering the temperature to between the freezing point of the leachate and about 40° C.

16. The process of claim 11, wherein the step of treating the cesium-containing re-leachate with the soluble aluminum salt in the presence of sulphate further comprises seeding the re-leachate with solid cesium alum.

17. The process of claim 11, further comprising:
re-dissolving the purified cesium alum in a heated aqueous purification solution;
adding barium hydroxide to the purification solution to precipitate in distinct steps aluminum hydroxide and barium sulphate, and concomitantly removing aluminum hydroxide from the purification solution and then removing barium sulphate from the purification solution, to provide an aluminum-free cesium solution; and,
adding a stoichiometric amount of barium hydroxide to the aluminum-free cesium solution, to provide a solution of cesium hydroxide.

18. The process of claim 17, wherein the heated aqueous purification solution is maintained at a pH of approximately 7.

19. The process of claim 17, further comprising adding formic acid to the cesium hydroxide solution, to provide cesium formate.

20. The process of claim 19, further comprising crystallizing the cesium formate.

21. The process of claim 20, wherein the cesium formate is crystallized by evaporative crystallization.

22. The process of claim 17, further comprising adding a mineral acid or carbon dioxide to the cesium hydroxide solution, to provide a mineral salt of cesium.

23. The process of claim 22, wherein the mineral acid is hydrochloric acid, nitric acid, sulphuric acid or carbonic acid.

24. The process of claim 23, wherein the mineral salt of cesium is cesium chloride, cesium nitrate, cesium sulphate or cesium carbonate.

25. The process of claim 1, wherein the cesium-alum-barren solution comprises a residual acid, further comprising recycling the residual acid to the step of hot acid leaching of the ground ore slurry.

26. The process of claim 11, further comprising recycling the intermediate solid to the step of hot acid leaching of the ground ore slurry.

27. The process of claim 26, wherein the intermediate solid comprises a residual cesium, and recycling the residual cesium solids to the hot acid leaching step increases the recovery of cesium from the ore.

28. The process of claim 1, further comprising producing an enriched fraction of the ore or of the concentrate of the ore, prior to leaching, wherein the enriched fraction is produced by a process of particle size separation.

* * * * *